United States Patent
O'Donnell et al.

(10) Patent No.: US 12,502,506 B2
(45) Date of Patent: Dec. 23, 2025

(54) MULTI-FLEX URINARY CATHETER

(71) Applicant: Hollister Incorporated, Libertyville, IL (US)

(72) Inventors: Paul M. O'Donnell, Castlebar (IE); Joseph Fahey, Newport (IE); Barbara J. Kearns, Balla (IE)

(73) Assignee: Hollister Incorporated, Libertyville, IL (US)

( * ) Notice: Subject to any disclaimer, the term of this patent is extended or adjusted under 35 U.S.C. 154(b) by 433 days.

(21) Appl. No.: 17/999,553

(22) PCT Filed: May 24, 2021

(86) PCT No.: PCT/US2021/033851
§ 371 (c)(1),
(2) Date: Nov. 21, 2022

(87) PCT Pub. No.: WO2021/242676
PCT Pub. Date: Dec. 2, 2021

(65) Prior Publication Data
US 2023/0191078 A1    Jun. 22, 2023

Related U.S. Application Data
(60) Provisional application No. 63/030,669, filed on May 27, 2020.

(51) Int. Cl.
*A61M 25/00* (2006.01)
*A61M 25/01* (2006.01)

(52) U.S. Cl.
CPC ........ *A61M 25/0009* (2013.01); *A61M 25/01* (2013.01); *A61M 25/0045* (2013.01)

(58) Field of Classification Search
CPC .............. A61M 25/0009; A61M 25/01; A61M 25/0045; A61M 25/005; A61M 39/10; A61M 25/0012; A61M 25/0102
See application file for complete search history.

(56) References Cited

U.S. PATENT DOCUMENTS 3,861,396 A    1/1975  Vaillancopurt et al.
3,938,529 A *  2/1976  Gibbons ............. A61M 27/008
                                                      604/524
(Continued)

FOREIGN PATENT DOCUMENTS

CN    202740588 U    2/2013
CN    104689450 A    6/2015
(Continued)

OTHER PUBLICATIONS

International Search Report and Written Opinion for PCT/US2021/033851 Dated Oct. 15, 2021.

*Primary Examiner* — Adam Marcetich
(74) *Attorney, Agent, or Firm* — Cook Alex Ltd.

(57) ABSTRACT

An intermittent urinary catheter assembly 100 includes a reinforcement member 106 extending longitudinally at least partially within the distal end portion of the inner drainage lumen 104 of the catheter shaft. The reinforcement member may serve to connect a drainage member 114 to the catheter shaft and includes a drainage passageway in fluid communication with the inner drainage lumen of the shaft for allowing the drainage of urine through the urinary catheter assembly.

20 Claims, 9 Drawing Sheets

(56) References Cited

U.S. PATENT DOCUMENTS

| | | | |
|---|---|---|---|
| 4,304,231 A | 12/1981 | Bodicky et al. | |
| 4,402,684 A * | 9/1983 | Jessup | A61M 25/0102 |
| | | | 128/207.14 |
| 4,511,163 A * | 4/1985 | Harris | A61M 39/12 |
| | | | 604/905 |
| 4,784,654 A * | 11/1988 | Beecher | A61F 5/455 |
| | | | 604/329 |
| 4,846,791 A * | 7/1989 | Hattler | A61M 25/0026 |
| | | | 606/198 |
| 4,995,865 A * | 2/1991 | Gahara | A61M 25/0026 |
| | | | 604/523 |
| 5,205,830 A | 4/1993 | Dassa et al. | |
| 5,382,238 A | 1/1995 | Abrahamson et al. | |
| 5,569,222 A * | 10/1996 | Haselhorst | A61M 39/10 |
| | | | 604/905 |
| 5,865,815 A * | 2/1999 | Tihon | A61M 25/0043 |
| | | | 604/523 |
| 6,245,029 B1 | 6/2001 | Fujita et al. | |
| 7,302,972 B1 * | 12/2007 | Stowe | F16L 59/21 |
| | | | 138/112 |
| 8,137,316 B2 | 3/2012 | Haarala et al. | |
| 8,177,771 B2 | 5/2012 | Butts et al. | |
| 8,202,461 B2 | 6/2012 | Racz | |
| 8,523,840 B2 | 9/2013 | Powers et al. | |
| 10,328,250 B2 | 6/2019 | Beach | |
| 2002/0065486 A1 * | 5/2002 | Balbierz | A61M 25/0612 |
| | | | 604/164.02 |
| 2002/0082547 A1 * | 6/2002 | Deniega | A61M 25/0074 |
| | | | 604/93.01 |
| 2002/0128596 A1 * | 9/2002 | Stivland | A61M 25/104 |
| | | | 606/192 |
| 2003/0191453 A1 * | 10/2003 | Velez | A61M 25/0068 |
| | | | 604/122 |
| 2003/0216700 A1 * | 11/2003 | Pearson | A61L 29/06 |
| | | | 604/266 |
| 2004/0044330 A1 * | 3/2004 | Li | A61J 15/0026 |
| | | | 604/535 |
| 2004/0158229 A1 | 8/2004 | Quinn | |
| 2006/0135941 A1 * | 6/2006 | Porto | A61M 25/007 |
| | | | 604/500 |
| 2008/0125756 A1 * | 5/2008 | Dicarlo | A61M 25/01 |
| | | | 128/898 |
| 2008/0167526 A1 * | 7/2008 | Crank | A61B 1/307 |
| | | | 600/156 |
| 2008/0300576 A1 * | 12/2008 | Vitullo | A61M 25/0113 |
| | | | 604/523 |
| 2009/0187165 A1 * | 7/2009 | Kaern | A61M 39/10 |
| | | | 604/533 |
| 2011/0213318 A1 | 9/2011 | Schertiger | |
| 2012/0150150 A1 * | 6/2012 | Cai | F16L 33/34 |
| | | | 604/524 |
| 2013/0245496 A1 * | 9/2013 | Wells | A61M 25/0017 |
| | | | 600/581 |
| 2014/0194857 A1 | 7/2014 | Eilat | |
| 2014/0236275 A1 * | 8/2014 | Thompson | A61F 2/95 |
| | | | 623/1.11 |
| 2015/0126971 A1 * | 5/2015 | Muller | A61M 25/0026 |
| | | | 604/523 |
| 2015/0297862 A1 | 10/2015 | Sadik et al. | |
| 2018/0360494 A1 * | 12/2018 | Melsheimer | A61B 17/1204 |
| 2019/0091461 A1 * | 3/2019 | Bonham | A61M 25/0014 |
| 2019/0105483 A1 * | 4/2019 | Desombre | A61F 5/0089 |
| 2019/0321587 A1 * | 10/2019 | McMenamin | A61M 25/0017 |
| 2020/0208369 A1 * | 7/2020 | Porter | E02D 5/226 |

FOREIGN PATENT DOCUMENTS

| | | |
|---|---|---|
| CN | 105079946 A | 11/2015 |
| JP | 4323221 B2 | 9/2009 |

\* cited by examiner

MULTI-FLEX URINARY CATHETER

The present application is the U.S. National Stage Application of PCT Application No. PCT/US2021/033851, filed May 24, 2021, which claims the benefit of and priority to U.S. Provisional Application No. 63/030,669, filed May 27, 2020, all of which is hereby incorporated herein by reference.

BACKGROUND

Field of the Disclosure

The present disclosure generally relates to catheter assemblies. More particularly, the present disclosure relates to catheter assemblies including a reinforcement member, where the reinforcement member imparts rigidity to a portion of the catheter. The present disclosure also relates to reinforcement members that include features for connecting a drainage member to the catheter shaft.

Description of Related Art

Urinary catheters, and in particular intermittent urinary catheters, are commonly used by those who suffer from various abnormalities of the urinary system, such as urinary incontinence. With the advent of intermittent urinary catheters, individuals with urinary system abnormalities can self-insert and self-remove intermittent catheters several times a day to drain the bladder.

Intermittent urinary catheters typically include a drainage member at the distal end of the catheter shaft. Such drainage members may be, but are not necessarily, funnel shaped. The drainage members may be used direct urine drainage from the catheter to a waste receptacle, such as a toilet. The drainage member also may be configured for attachment to a urine collection system, such as a urine collection bag.

Commonly, the drainage member is attached to the catheter shaft by adhesive, welding and/or chemical bonding. Adhesive and chemical bonding require the storage of adhesive/chemical during manufacturing and the application of such adhesive/chemicals during catheter assembly. Furthermore, when the drainage member is attached with adhesive/chemical bonding, there is typically a drying/curing period, which can slow down the manufacturing process. Regarding attachment by welding, this typically requires specialized welding apparatus to attach the drainage member to the catheter shaft.

There remains a need for improved methods for attaching a drainage member to a catheter shaft.

In addition to the above, in some intermittent urinary catheter applications, it may be desirable for a catheter to vary in flexibility along the catheter shaft so that the catheter includes the benefits of both a stiff and soft catheter in a single catheter device. That is, it may be desirable for a section of the catheter tube to be more rigid than other sections. For example, because of the natural contours of the urethra, it may be desirable for a urinary catheter tube to have a softer, more flexible proximal insertion end portion that enables easier insertion of the catheter tube into the urethra. The more flexible proximal end portion also may aid in the navigation of the catheter tube through the natural contours of the urinary system. It may also be desirable for the catheter to have a stiffer rear section that facilitates the user's handing and maneuverability of the catheter. Therefore, there remains a need for improved catheters that have varying flexibility along the catheter shaft and methods for making the same.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In a first aspect, an intermittent urinary catheter assembly is disclosed. The catheter assembly comprises a catheter shaft including an inner drainage lumen. The inner drainage lumen has a proximal end portion and a distal end portion. The catheter assembly also includes a reinforcement member extending longitudinally at least partially within the distal end portion of the inner drainage lumen. The reinforcement member includes a drainage passageway in fluid communication with the inner drainage lumen of the shaft. This allows the drainage of urine through the urinary catheter assembly.

In another aspect, a connector is disclosed. The connector is configured to fluidically connect a catheter shaft to a drainage member. The connector comprises a reinforcement member configured to extend longitudinally at least partially within a distal end portion of an inner drainage lumen of the catheter shaft. The reinforcement member includes a drainage passageway configured to be in fluid communication with the inner drainage lumen of the shaft. This allows the drainage of urine through the inner drainage lumen.

In yet another aspect, a method of assembling a catheter assembly is disclosed. The method comprises mechanically connecting a distal end of a connector to a drainage member and mechanically attaching a proximal end of the connector to a distal end of a catheter shaft, before or after connecting the connector to the drainage member. The proximal end of the connector defines a reinforcement member that is inserted into and extends longitudinally at least partially within a distal end portion of an inner drainage lumen of the catheter shaft. The reinforcement member further includes a drainage passageway that is in fluid communication with the inner drainage lumen of the shaft and the drainage member.

DESCRIPTION OF THE ILLUSTRATED EMBODIMENTS

The embodiments disclosed herein are for the purpose of providing a description of the present subject matter, and it is understood that the subject matter may be embodied in various other forms and combinations not shown in detail. Therefore, specific embodiments and features disclosed herein are not to be interpreted as limiting the subject matter as defined in the accompanying claims.

Figures 1, 1A:
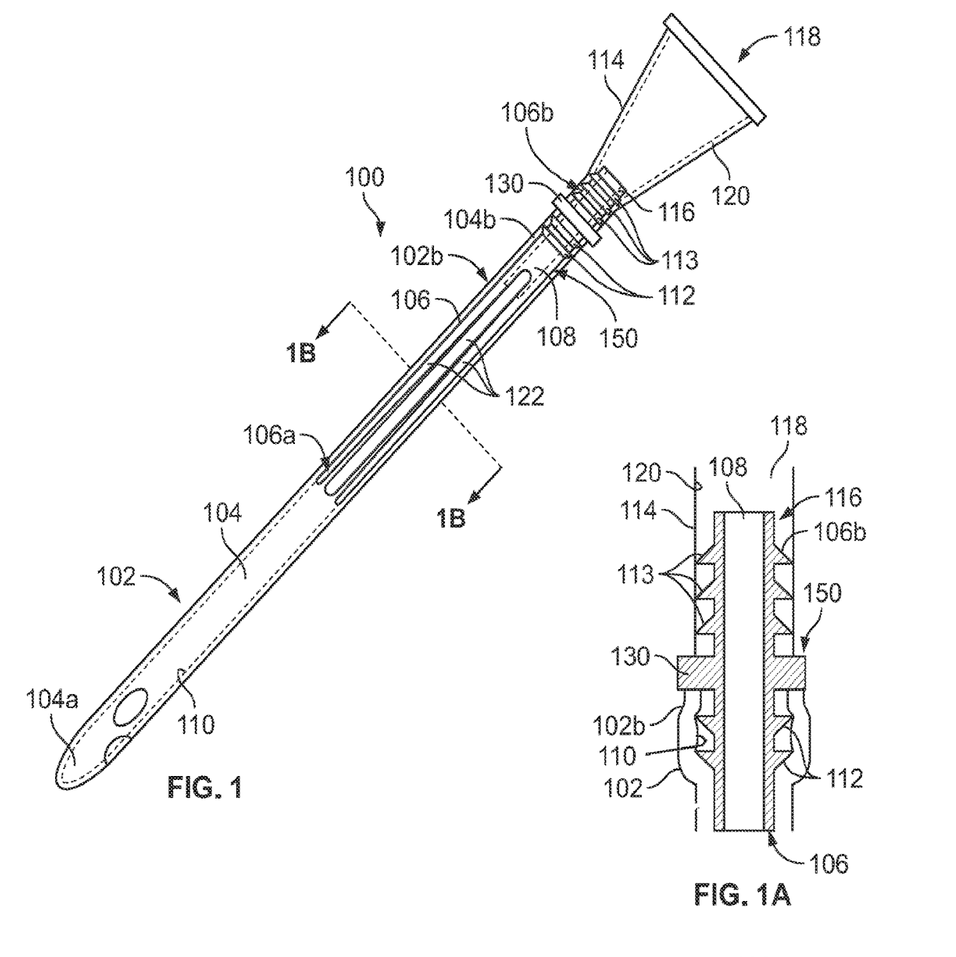
FIG. 1 is a perspective view of an embodiment of a catheter assembly.
FIG. 1A is an enlarged cross-sectional view of a connector portion in the assembly of FIG. 1.

Catheter assemblies according to the present disclosure and their individual components may be variously configured without departing from the scope of the present disclosure, but in one embodiment, an intermittent urinary catheter assembly is configured as shown in FIG. 1.

Figure 2:
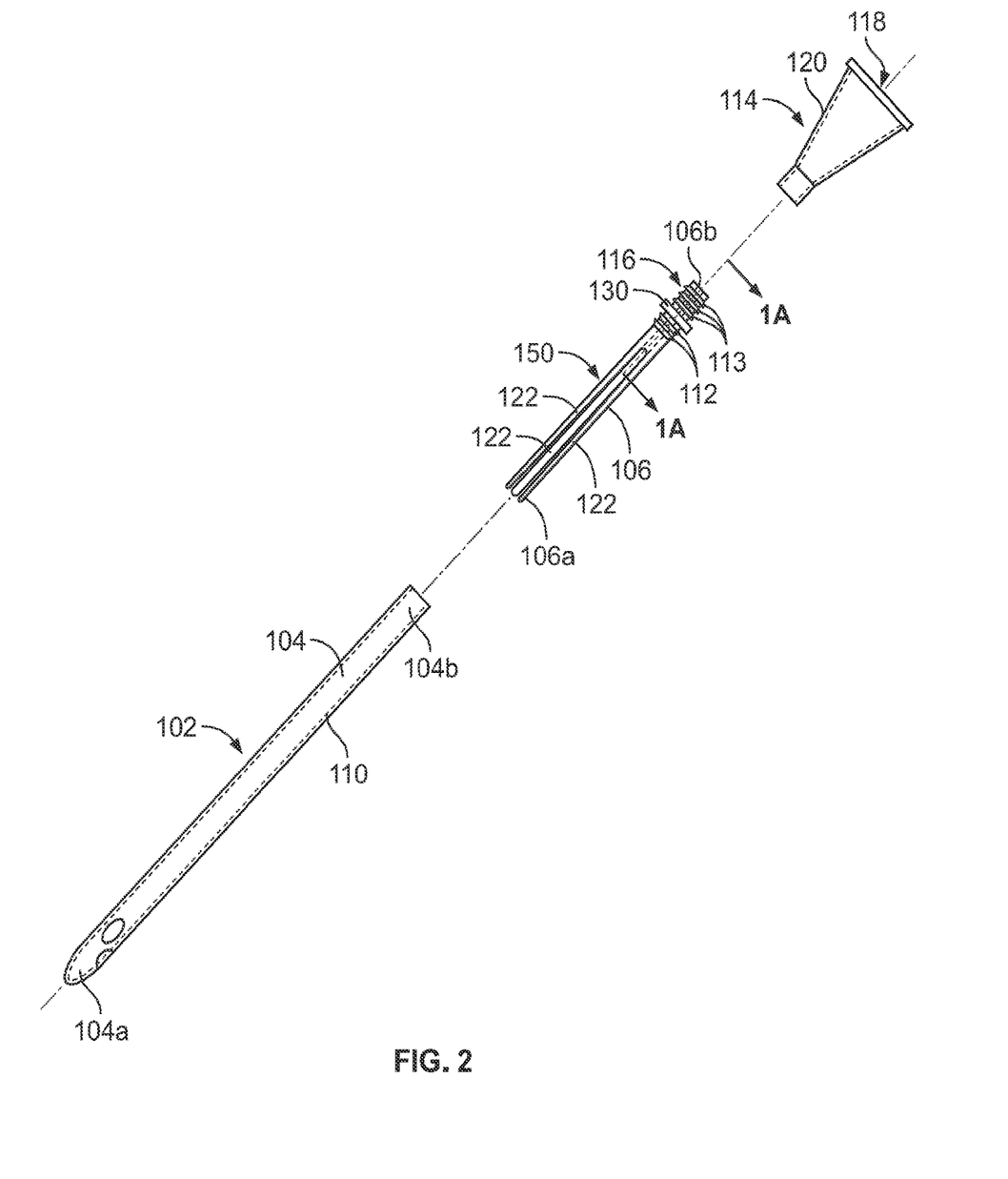
FIG. 2 is an exploded view of the assembly of FIG. 1.

FIGS. 1-2 show an embodiment of an intermittent urinary catheter assembly 100 comprising a catheter shaft 102 including an inner drainage lumen 104. The inner drainage lumen has a proximal end portion 104a and a distal end portion 104b. The assembly 100 also includes a connector 150 configured to mechanically and fluidically connect the catheter shaft 102 to a drainage member 114. The drainage member 114 may be a funnel or a catheter collection system attachment member. The connector 150 may include a reinforcement member 106 associated therewith, or in other words, the reinforcement member 106 may serve as a connector or include a connector 150 for operatively connecting the drainage member 114 to the catheter shaft 102. The reinforcement member 106 extends longitudinally at least partially within the distal end portion 104b of the inner drainage lumen. The reinforcement member may include at least one spline 122. As shown in FIGS. 1 and 2, the reinforcement member 106 includes three splines 122. Alternatively, the reinforcement member 106 could include less than three splines or more than three splines. For example, the reinforcement member 106 may include four or more splines 122. In other embodiments, the reinforcement member 106 may include any other appropriate number of splines 122.

The splines 122 may be of variable stiffness by material selection and design. For example, the reinforcement member/splines may be made from a polymer or metal. For example, the reinforcement member/splines may be made from Polyethylene, Nylon, PEEK, or stainless steel (such as spring stainless steel). The reinforcement members/splines may also be made of co-injection molded material having the material within the structure itself made up of two or more materials. The materials also may be of a composite nature i.e. metal over molded with a polymer or some other material. Furthermore, the thickness and/or cross-section of the splines may be selected to tailor the flexibility of the spline depending on the desired use. For example, the splines may be tapered longitudinally toward the proximal end. In another embodiment, the splines may be tapered longitudinally toward the distal end. Alternatively, or in addition to the tapering, the wall thickness of the spline may be varied or tapered.

The splines 122 may extend along and come into contact with the inner surface of the catheter shaft 102 at any point around the shaft's 102 inner circumference that defines the inner lumen 104. For example, in FIG. 1B, the splines 122a, 122b, 122c may contact the inner surface 110b of the catheter shaft 102. The splines 122 may act as a reinforcement for the portion of the catheter shaft 102 that is in contact with or comes into contact with the splines 122. The splines 122 may serve to stiffen or make the portion of the catheter shaft 102 relatively more rigid than the proximal portion 104a of the catheter shaft 102. As mentioned above, rigidity/flexibility of the reinforcement member/splines can be tailored as desired by altering the cross-sectional shape of the splines, altering or tapering the spline profile along its length, altering or tapering the wall thickness of the splines, and altering or tapering the outer dimensions of the splines. The reinforcement 106/splines 122 have the effect of adding variable stiffness to the catheter shaft 102. For example, as shown in FIG. 1 the distal end portion 104b is reinforced by the splines 122 and thus may have a different flexibility than the proximal end portion 104a, which is not reinforced by the splines 122. Because of the reinforcement, the distal end portion 104b may be stiffer than the proximal end portion 104a. Additionally, the variable flexibility caused by the reinforcement member 106 may provide a catheter user with better control and manipulation of the catheter during use, since the distal end portion 104b of the catheter shaft 102 may not be as prone to being shifted by the forces applied during insertion of the catheter into the urethra.

The reinforcement member 106 also includes a drainage passageway 108 in fluid communication with the inner drainage lumen 104 of the shaft 102 and with a drainage lumen 118 of the drainage member 114. This allows drainage of fluid/urine through the assembly 100 and out of drainage member 114. Optionally, the drainage passageway 108 and/or the drainage lumen 118 of the drainage member have a fluid passageway that is equal to or greater than the inner drainage lumen 104. For example, the diameters of the drainage passageway 108 and/or the drainage lumen 118 of the drainage member may have the same or large diameter of the drainage lumen 104 of the shaft 102. Furthermore, the cross section, stiffness and flexibility of the reinforced portion of the shaft may be optimized so as to assist in controlling the flow rate. For example, the reinforcement member may be optimized so that flow rate restriction is minimized. Urine flowing through the catheter may flow more freely because the reinforcement member 106 minimises risk of kinking of the reinforced portion of the shaft 102. Embodiments of the drainage passageway 108 are further shown and described in FIG. 1B.

Figure 1B:
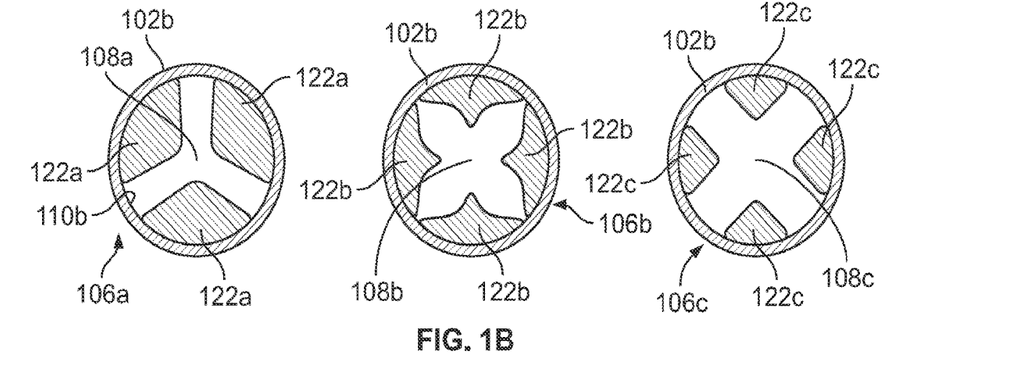
FIG. 1B is a series of cross-sectional views of the assembly of FIG. 1, showing various possible configurations of the reinforcement member taken through line 1B-1B of FIG. 1.

FIG. 1B shows cross-sections of the distal portion of the catheter assembly 102b of FIG. 1, with the reinforcement member 106 inserted within the lumen of the catheter shaft 102. From left to right, FIG. 1B shows: 1) an assembly having a reinforcement member 106a with three splines 122a, forming a tripod-shaped lumen 108a; 2) an assembly having a reinforcement member 106b with four splines 122b, forming a flower-shaped lumen 108b; and 3) an assembly having a reinforcement member 106c with four splines 122c, forming a substantially cruciform-shaped lumen 108c. Each configuration provides different flexibility of the catheter shaft because the splines contact the surface of the shaft over varying surface areas. Furthermore, each configuration also results in a different fluid flow rate because the area and shape of the reinforcement members alters the rate at which fluid passes through the lumens.

The reinforcement member 106 may be mechanically attached to the catheter shaft 102 by mechanical engagement between the connector portion 150 and the catheter shaft 102. The connector portion 150 of the reinforcement member 106 may be push-fit into the inner drainage lumen 104 of the catheter shaft 102. Additionally, other types of mechanical attachments may be used. As shown in FIGS. 1 and 1A, the catheter shaft 102 may further include an inner wall 110 defining the inner drainage lumen 104. The connector portion 150 may include one or more shoulders 112 extending radially from the reinforcement member 106. The shoulders 112 engage the inner wall 110. Alternative embodiments may use any appropriate number of shoulders. For example, in the illustrated embodiment two shoulders are shown. As shown, in FIG. 1A, the shoulders may have a generally flared shape, however in alternative embodiments other appropriate shapes known to one of ordinary skill may be used.

As illustrated in FIGS. 1, 1A and 2, the drainage member 114 may be located at a distal end 106b of the reinforcement member 106 and outside of a distal end portion 102b of the catheter shaft. For example, the drainage member 114 may be connected to connector portion 150. The connector portion 150 or the reinforcement member distal end 106b may define a stub shaft 116 that extends beyond the distal end portion 104b of the inner drainage lumen 104. The drainage member 114 includes a lumen 118 that is push-fit over the stub shaft 116. The drainage member 114 has an inner wall 120 that defines the drainage member lumen 118. The stub shaft 116 shown in FIGS. 1, 1A and 2 includes at least one shoulder 113 that is configured to engage the drainage member inner wall 120. In alternative embodiments, any appropriate number of shoulders may be used. For example, in the illustrated embodiment, three shoulders are shown. In FIGS. 1, 1A and 2, the shoulders 113 have a flared shape. In alternative embodiments, the at least one shoulder that engages the inner wall of the drainage member may have other appropriate shapes.

As shown in FIG. 1A, the shoulders 113 contacting the drainage member may optionally be tapered or flared in the opposite direction of the shoulders 112 which contact the catheter shaft 102. For example, the shoulders 113 contacting the drainage member are flared toward the proximal end of the catheter assembly, while the shoulders 112 contacting the catheter shaft are flared toward the distal end of the catheter assembly. The shoulders may be configured this way as an anti-pullout feature causing the reinforcement member 106 to be easily inserted, but more difficult to remove. The shoulders may be push fit into both the catheter shaft and the drainage member. Alternatively, the shoulders may mechanically engage with the catheter shaft inner walls 110 and the drainage member inner walls 120 in any other appropriate manner.

As mentioned above, the reinforcement member 106 may serve as a connector for connecting the drainage member 114 and catheter shaft 102. FIG. 1A shows an enlarged partial view of the reinforcement member 106/connector in the area of the connection between the catheter shaft 102 and drainage member 114. The distal end portion of the reinforcement member/connector defines a stub shaft 116 that extends out of the catheter shaft 102. The stub shaft 116 is inserted into and mechanically engages the drainage member 114 to connect the drainage member to the reinforcement member. Optionally, the connector portion 150 also includes a stop 130 (also shown in FIGS. 1 and 2) that is proximal or below the stub shaft 116. The stop 130 may be a stop collar. When the stop 130 is included, it contacts the proximal end of the drainage member 114 to prevent over insertion of the stub shaft 116 into the lumen 118 of the drainage member.

As also described above, the connector portion 150 includes a proximal portion that is inserted into the distal end portion 104b of the lumen 104 of the catheter shaft 102. When a stop 130 is included, the distal end of the catheter shaft abuts the stop 130 to prevent over insertion of the reinforcement member 106 into the catheter shaft 102.

Figures 1C, 1D:
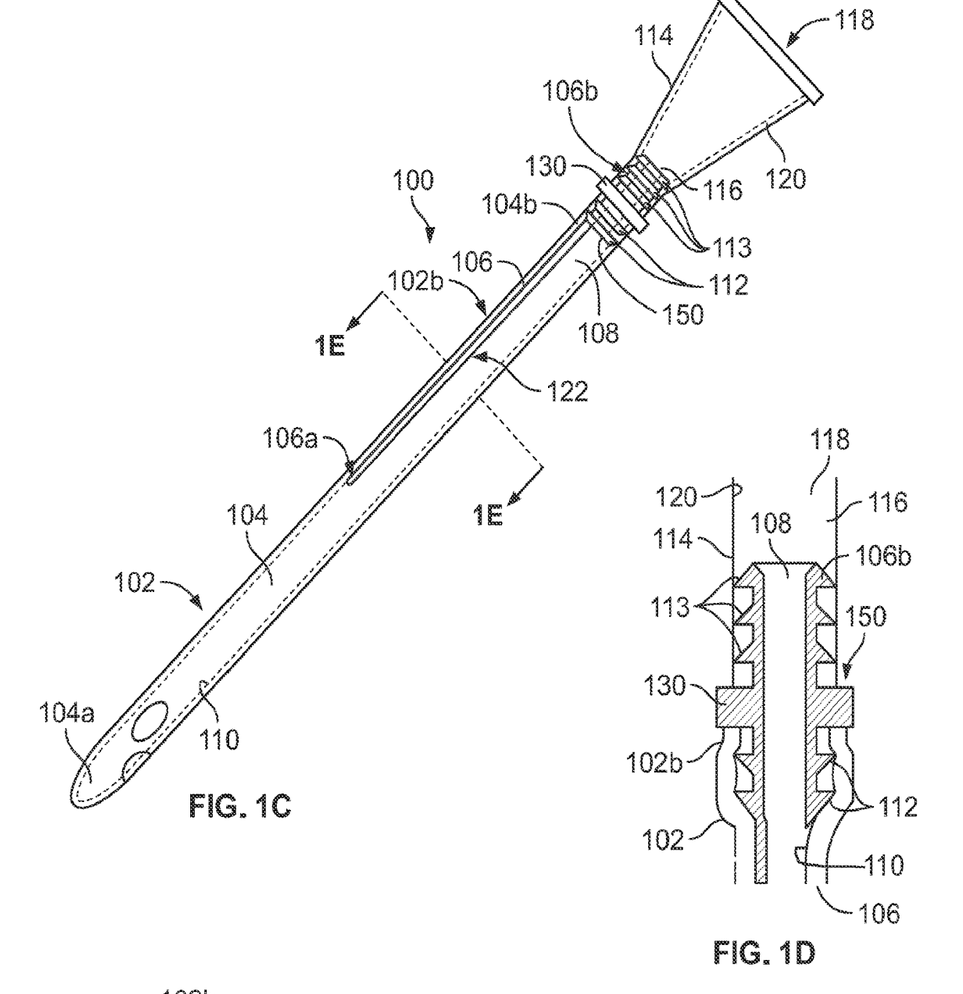
FIG. 1C is a perspective view of an embodiment of the catheter assembly having a single spline.
FIG. 1D is an enlarged cross-sectional view of a connector portion in the assembly of FIG. 10.
Figure 1E:
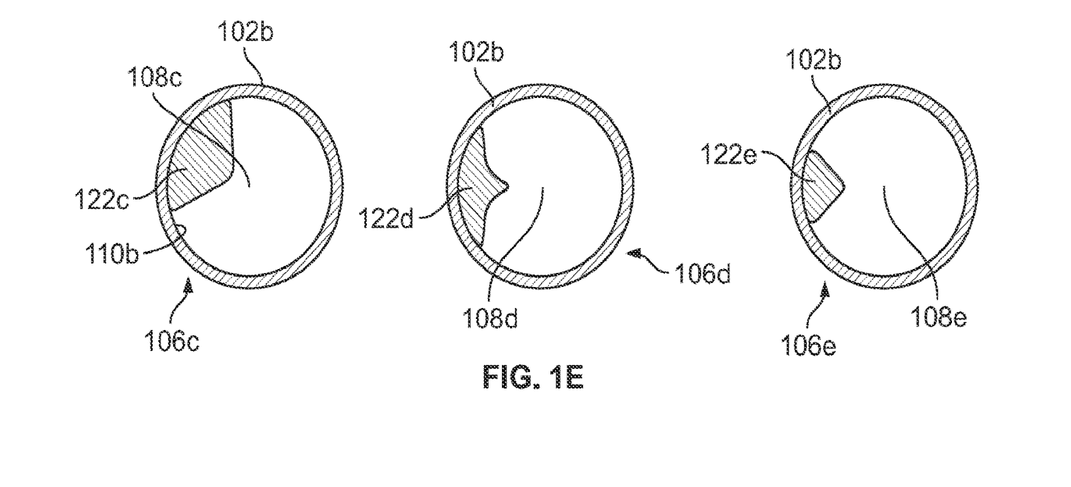
FIG. 1E is a series of cross-sectional views of the assembly of FIG. 10, showing various possible configurations of the reinforcement member taken through line 1E-1E of FIG. 10.

FIGS. 1C-1E show an embodiment of an assembly 100 including a connector portion 150 having similar features to those of FIGS. 1-1B numbered in a similar fashion. In this embodiment, the reinforcement member 106 has a single spline 122 that runs along one side of the catheter shaft 102. FIG. 1D shows the connector portion 150 within the shaft 102. The connector portion 150 is asymmetrical having the spline 122 extending from one side of the connector portion 150 of the reinforcement member 106. FIG. 1E shows cross-sections of the distal portion of the catheter assembly 102b of FIG. 1C, with the reinforcement member 106 inserted into the lumen of the catheter shaft 102. From left to right, FIG. 1E shows: 1) an assembly having a reinforcement member 106c with a single spline 122c having a generally triangular shaped cross-section. The spline 122c contacts the distal portion 102b over approximately 33% of the inner surface 110b and projects into lumen 108b; 2) an assembly having a reinforcement member 106d with a single spline 122d having a substantially tear-drop shape and extending into lumen 108d; and 3) an assembly having a reinforcement member 106e with a single spline 122e which contacts the distal portion 102b over approximately ⅛ of the inner surface and extends into lumen 108e. Each configuration provides different flexibility of the catheter shaft because the splines contact the surface of the shaft over varying surface areas. Additionally, as mentioned above, the splines may be longitudinally tapered and/or the wall thickness of the spline may vary along the spline. Furthermore, each configuration also results in a different fluid flow rate because the area and shape of the lumens alters the rate at which fluid passes through the lumens.

In the embodiments shown, the drainage member and reinforcement member are separate components that are attached together. In one alternative, the reinforcement member and drainage member may be one single unitary component. For example, the drainage member and reinforcement member may be injection molded. The injection molding may be a single shot molding or a two-shot molding wherein the drainage member is over-molded onto the reinforcement member.

In further alternative embodiments of the assembly, the drainage member may be a collection bag attachment member or may be a conduit to a collection bag. The drainage member may connect a fluid collection bag, such as a urine collection bag, to the reinforcement member.

Figure 3:
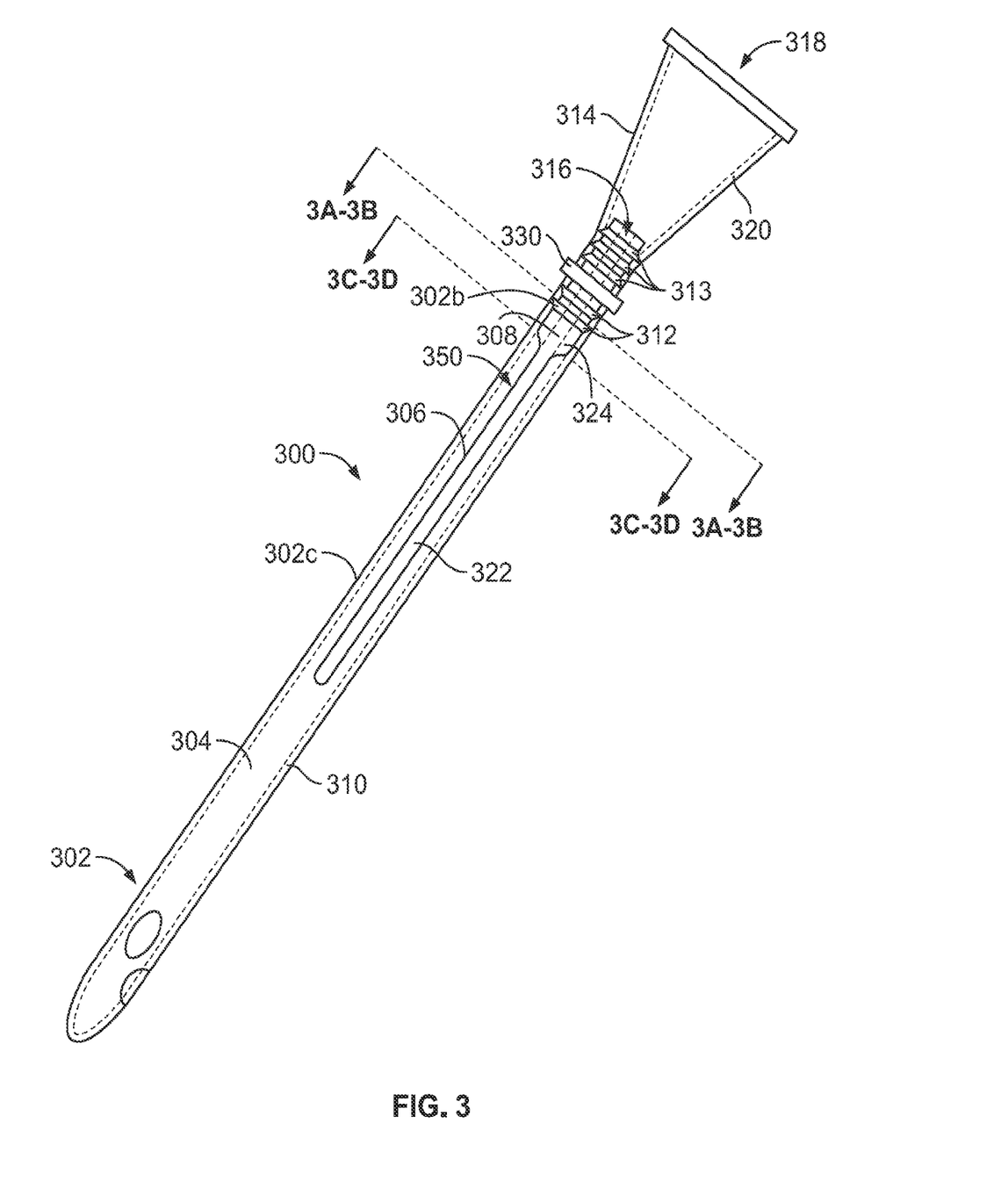
FIG. 3 is a perspective view of an embodiment of a catheter assembly.

FIG. 3 shows an embodiment of a urinary catheter assembly 300 wherein the connector 350 is associated with a reinforcement member 306, or in other words, the reinforcement member also serves as a connector. The reinforcement member 306 includes a tapered portion 324, leading to a single spline 322. The spline 322 extends longitudinally from the tapered portion 324 and at least partially within an inner drainage lumen 304 of a catheter shaft 302. The reinforcement member 306 may form a substantially circular cross section. Accordingly, the spline 322 may be rod-shaped. The spline 322 may be of variable stiffness by material selection and design. For example, the reinforcement member/spline may be made from a polymer or metal. For example, the reinforcement member/spline may be made from Polyethylene, Nylon, PEEK, or stainless steel (such as spring stainless steel). Furthermore, the thickness and/or cross-section of the spline may be selected, depending on the desired use. The spline 322 may be tapered from from its distal end to its proximal end.

Optionally, the outer diameter of the spline 322 may have diameter dimensions that are approximately 25% of the dimensions of the inner diameter of the shaft 302. For example, in an embodiment, the cross-sectional area of the spline may be 0.78 mm$^2$ (based a 1 mm spline outer diameter, while the cross-sectional area of the inner diameter of the catheter shaft may be 12.56 mm$^2$ (based on a catheter shaft inner diameter of 4 mm). In alternative embodiments other appropriate dimensions may be used. In the illustrated embodiment, the tapered portion 324 provides increased support at the distal end of the catheter shaft 302b, while the spline 322 provides intermediate support in a section 302c of the shaft where the spline 322 touches or comes into contact with the shaft 302. In one embodiment, the spline 322 may have a length of 8-20 cm, however in alternative embodiments other lengths may be used.

Figure 3A:
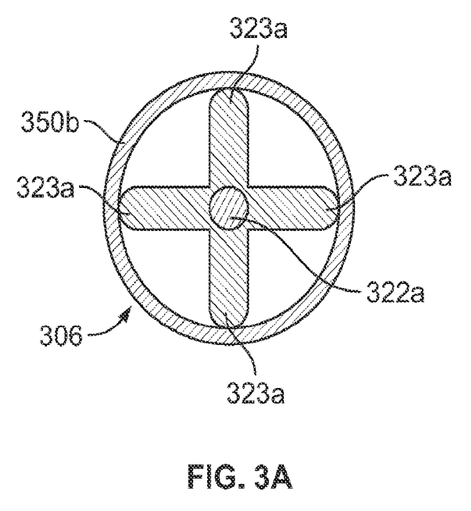
FIG. 3A is a cross-sectional view of the assembly of FIG. 3, showing a possible configuration of the reinforcement member taken through line 3A-3B of FIG. 3.

FIGS. 3A-3D show cross-sections of the reinforcement member removed from the catheter tube and in particular a cross-section at a location wherein the spline and connector portion meet. FIG. 3A shows an assembly having a reinforcement member 306 with four spokes 323a holding the spline 322a in line with the center axis of the connector portion 350b. The spokes 323a engage the inner wall of the connector portion 350b to connect the spline 322a to the connector portion.

Figure 3B:
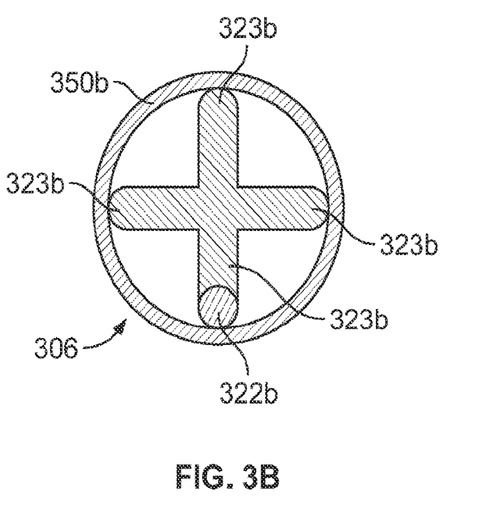
FIG. 3B is a cross-sectional view of the assembly of FIG. 3, showing another possible configuration of the reinforcement member taken through line 3A-3B of FIG. 3.

FIG. 3B shows a similar embodiment to FIG. 3A, with the reinforcement member 306b having four spokes 323b and a spline 322b extending from the spokes. As shown, the spline 322b is offset from the center and is placed at the end of a spoke 323b. This configuration allows the spline to more closely contact a specific side of the catheter shaft 302, providing increased support to the specific side, while allowing for increased flexibility on the non-supported sides.

Figure 3C:
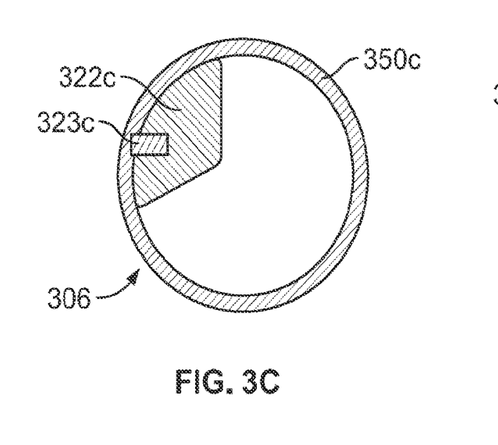
FIG. 3C is a cross-sectional view of the assembly of FIG. 3, showing a possible configuration of the reinforcement member taken through line 3C-3D of FIG. 3.

FIG. 3C shows a configuration of a reinforcement member 306 where the spline 322c and connector portion 350c are anchored together by a bridge member 323c, shown in FIG. 3C as a pin that extents into each of the splines and the connector portion.

Figure 3D:
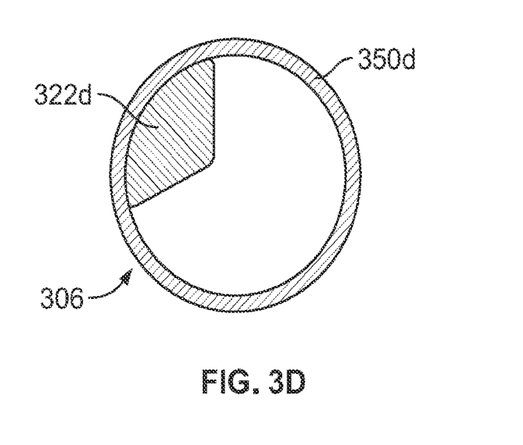
FIG. 3D is a cross-sectional view of the assembly of FIG. 3, showing another possible configuration of the reinforcement member taken through line 3C-3D of FIG. 3.

FIG. 3D shows a similar configuration to 3C, except the spline 322d and connector portion 350d are a unitary piece. For example, the spline and connector portion may be a single shot or two shot injection molded piece.

Each configuration provides different flexibility of the catheter shaft because the splines contact the surface of the shaft over varying surface areas. Furthermore, each configuration also results in a different fluid flow rate because the area and shape of the lumens alters the rate at which fluid passes through the lumens.

Similar to the embodiment shown in FIGS. 1-2, the shaft 302 is connected to a drainage member 314 by the reinforcement member 306.

Figures 4, 4A:
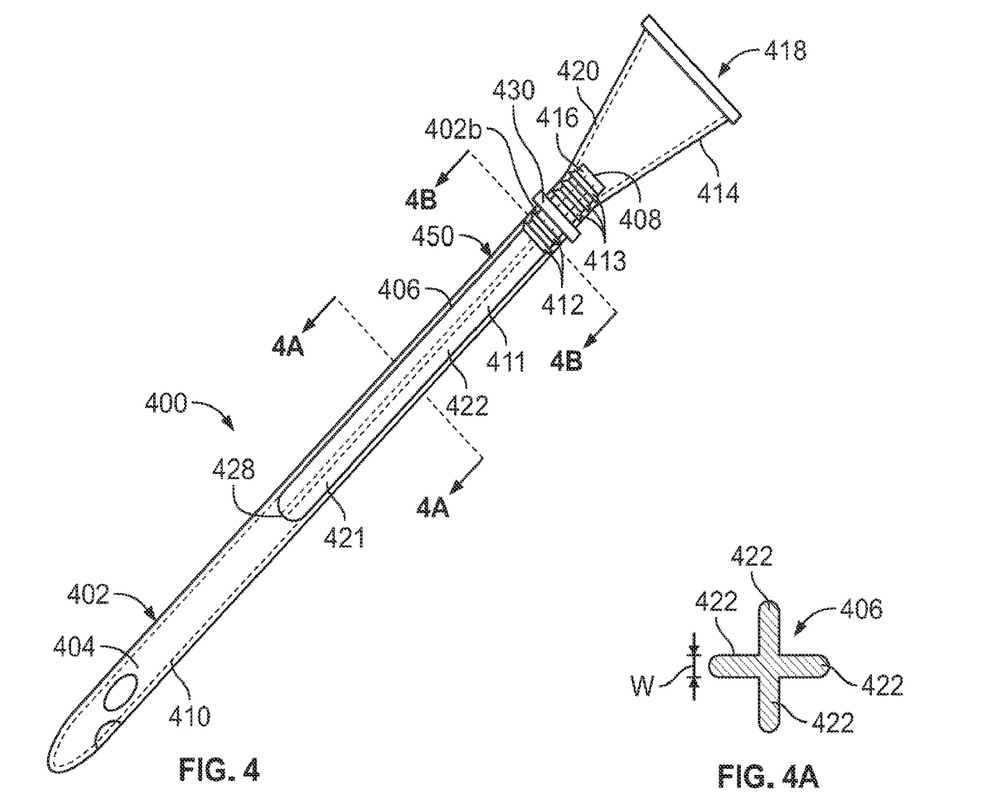
FIG. 4 is a perspective view of an embodiment of a catheter assembly.
FIG. 4A is a cross-sectional view of the assembly of FIG. 4, showing a portion of a reinforcement member taken through line 4A-4A of FIG. 4.

FIG. 4 shows a catheter assembly 400 having a catheter shaft 402 connected to a drainage member 414 by a connector 450 associated with a reinforcement member 406, or in other words the reinforcement member may serves as a connector or may have connector portion 450. Similar to the other catheter assemblies disclosed herein, the connector portion 450 includes a stub shaft 416 which serves as a connecting portion between the connector 450 and the drainage member 414. The drainage member 414, catheter shaft 402 and stub shaft 416 are all substantially similar to those same elements shown in FIGS. 1-3. Furthermore, in one alternative, the reinforcement member 406/connector 450 and the drainage member 414 may be a single unitary or one-piece component. As shown in FIGS. 4-4C, the reinforcement member 406 may include a spline 421 that includes a plurality of vanes 422. In the illustrated embodiment the reinforcement member 406 includes four vanes 422 extending longitudinally and radiating outwardly from a central axis. In this embodiment, the reinforcement member 406 includes two pairs of directly opposed vanes, such that the reinforcement member 406 has a cruciform cross-sectional shape as shown in FIG. 4A. In other embodiments, the vanes may be spaced apart in any suitable manner. The vanes 422 may extend through at least a distal portion of the catheter shaft lumen 404.

Figure 4B:
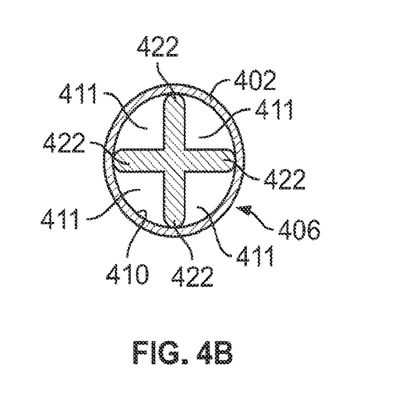
FIG. 4B is a cross-sectional view of the assembly of FIG. 4 showing a second portion of the reinforcement member and the catheter shaft taken through line 4B-4B of FIG. 4.
Figure 4C:
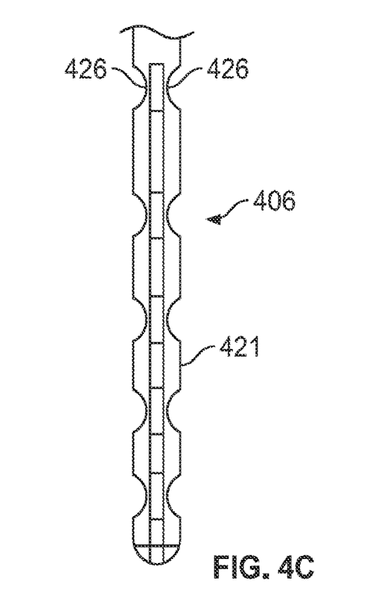
FIG. 4C is an enlarged partial elevational view of the reinforcement member of FIG. 4.

FIG. 4B shows a cross-section of the reinforcement member 406 near the distal end 402b of the catheter shaft 402 and below the connector portion 450. The ends of each vane 422 contact or come into contact with the inner wall 410 of catheter 402. The spaces 411 between the vanes 422 and the inner wall 410 define flow passageways for the flow of urine from the lumen 404 of the catheter shaft 402 to the drainage passageway 408, which is in fluid communication with the drainage member 414.

Furthermore, the vanes may have a width W (FIG. 4A) measured from one side of the vane to the other side radially outward to its terminal end of edge. Furthermore, the reinforcement member with vanes may taper in cross section from the distal to the proximal end. For example, the vane may have a width of about 0.25 mm. In another embodiment the vanes may have a width of 0.5 mm. As shown in FIG. 4, the spline 421 may have a rounded tip 428.

Referring to FIG. 4C, optionally, all or some of the vanes 422 of the spline 421 may include one or more notches 426. The notches 426 provide stress relief to the catheter shaft 402, as the catheter is bent. The notches 426 may allow bending but prevent kinking of the shaft 402. Any appropriate plurality of notches may be used. The notches 426 may also aid the flexibility of the reinforcement member 406. As shown, the notches 426 may be set substantially parallel to each other as they run along the shaft 402. In alternative embodiments the notches may be uniformly offset longitudinally from each other, such that the notches may be helically oriented. In other embodiments, the notches may be randomly offset from one another.

Figure 5:
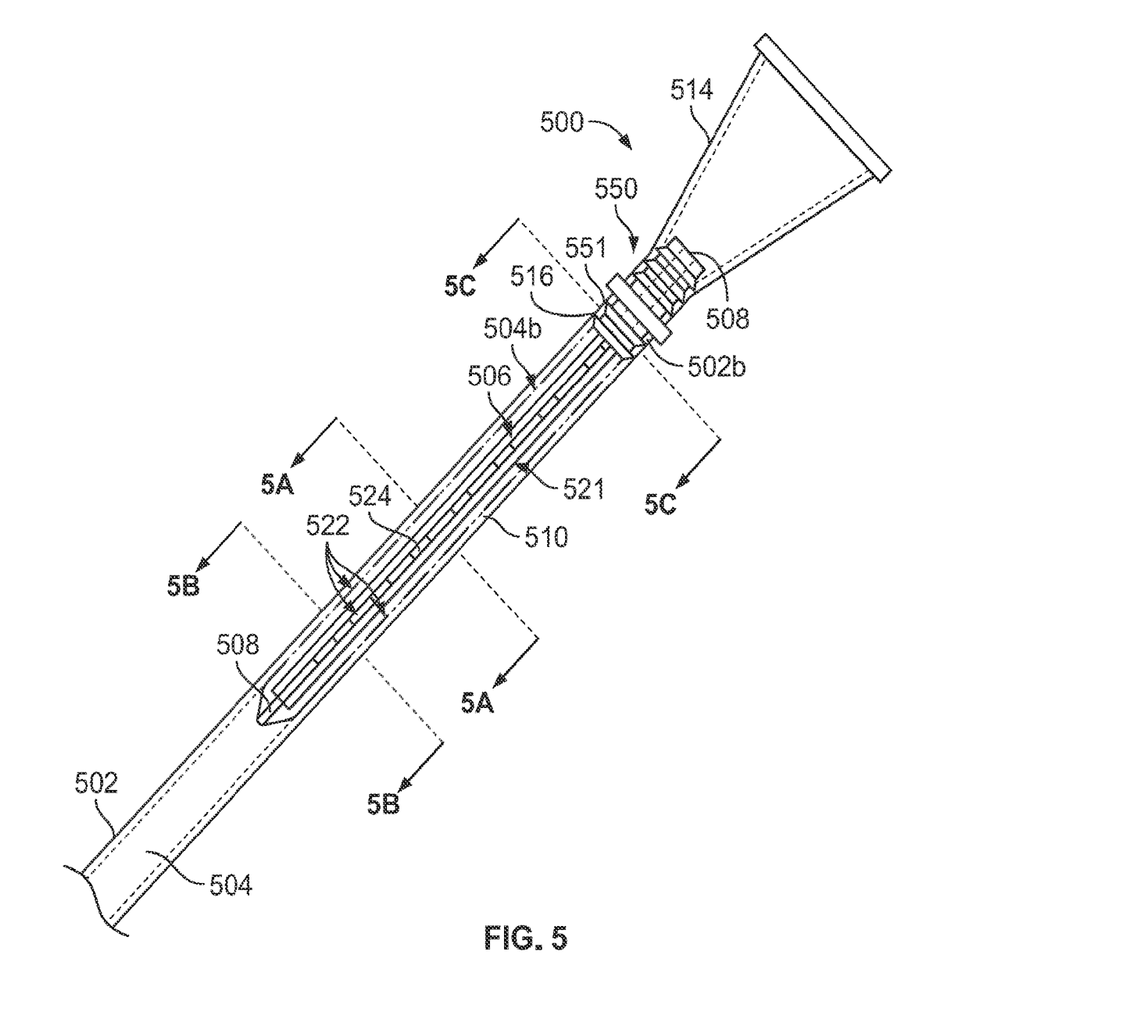
FIG. 5 is a perspective view of an embodiment of a catheter assembly.
Figure 5A:
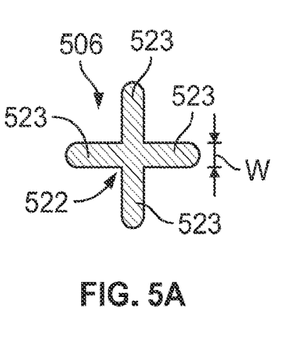
FIG. 5A is a cross-sectional view of the assembly of FIG. 5, showing a portion of a reinforcement member taken through line 5A-5A of FIG. 5.
Figure 5B:
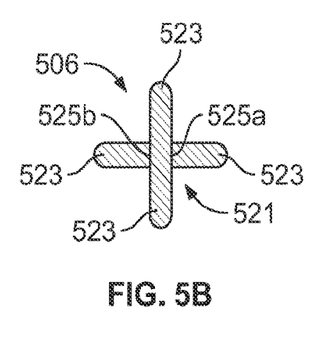
FIG. 5B is a cross-sectional view of the assembly of FIG. 5, showing a second portion of the reinforcement member taken through line 5B-5B of FIG. 5.
Figure 5C:
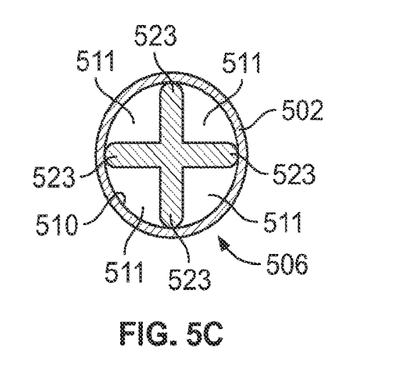
FIG. 5C is a cross-sectional view of the assembly of FIG. 5 showing a third portion of the reinforcement member taken through line 5C-5C of FIG. 5.

FIGS. 5-5C show an embodiment of the catheter assembly 500 having a catheter shaft 502 connected to a drainage member 514 by a connector 550 associated with a reinforcement member 506, or in other words the reinforcement member may serve as a connector or may have a connector portion 551. Like the other catheter assemblies disclosed herein, the connector portion 551 includes a stub shaft 516 which serves as a connecting portion between the connector 550 and the drainage member 514. The drainage member 514, catheter shaft 502, and stub shaft 516 are all substantially similar to those same elements shown in FIGS. 1-4. Furthermore, in one alternative, the reinforcement member 506/connector, and the drainage member 514 may be a single unitary or one-piece component.

The reinforcement member 506 may include a spline 521 that includes a plurality of sets of protrusions 522. Between the sets of protrusions 522, the spline 521 has an opening 524 therethrough. Referring to FIG. 5B, the opening is located between opposed walls 525*a* and 525*b*, which extend longitudinally between the sets of protrusions. As shown in FIG. 5A, the sets of protrusions 522 may include four vanes 523 extending longitudinally and radiating outward from a central axis. In this embodiment, the protrusions 522 include two pairs of directly opposed vanes 523, such that the reinforcement member has a cruciform cross-sectional shape, as shown in FIG. 5A. In other embodiments, the protrusions may have any number of vanes and the vanes may be spaced apart in any suitable manner. The protrusions 522 may extend through at least a distal portion 504*b* of the catheter shaft lumen 504.

As shown in FIG. 5, in this embodiment, the reinforcement member 506 may alternate between hollow sections (shown in 5B) and non-hollow sections (shown in 5A). FIG. 5B shows a cross-section of a hollow section of the spline 521. The hollow section has the opening along the central axis of the spline 521. The hollow section provides increased shaft 502 flexibility, because the opening allows more space for the protrusions 522 and the shaft 502 to flex. The configuration shown in FIG. 5 allows for variable flexibility along the portions of the catheter assembly 500 reinforced by the reinforcement member 506 and spline 521. The portions of the shaft 502 that are contacted by the non-hollow sections of the reinforcement member, may be stiffer than the portions of the shaft 502 that are contacted by the hollow sections of the reinforcement member.

FIG. 5C shows a cross-section of the reinforcement member 506 near the distal end 502*b* of the catheter shaft 502 and below the connector portion 550. The ends of each vane 523 contact or come into contact with the inner wall 510 of the catheter shaft 502. The spaces 511 between the vanes 523 and the inner wall 510 define flow passageways for the flow of urine from the lumen 504 of the catheter shaft 502 to the drainage passageway 508 which is in fluid communication with the drainage member 514. As shown in FIG. 5C the reinforcement member 506 may be hollow at this portion, having the opening along the central axis of the reinforcement member 506.

Figure 6:
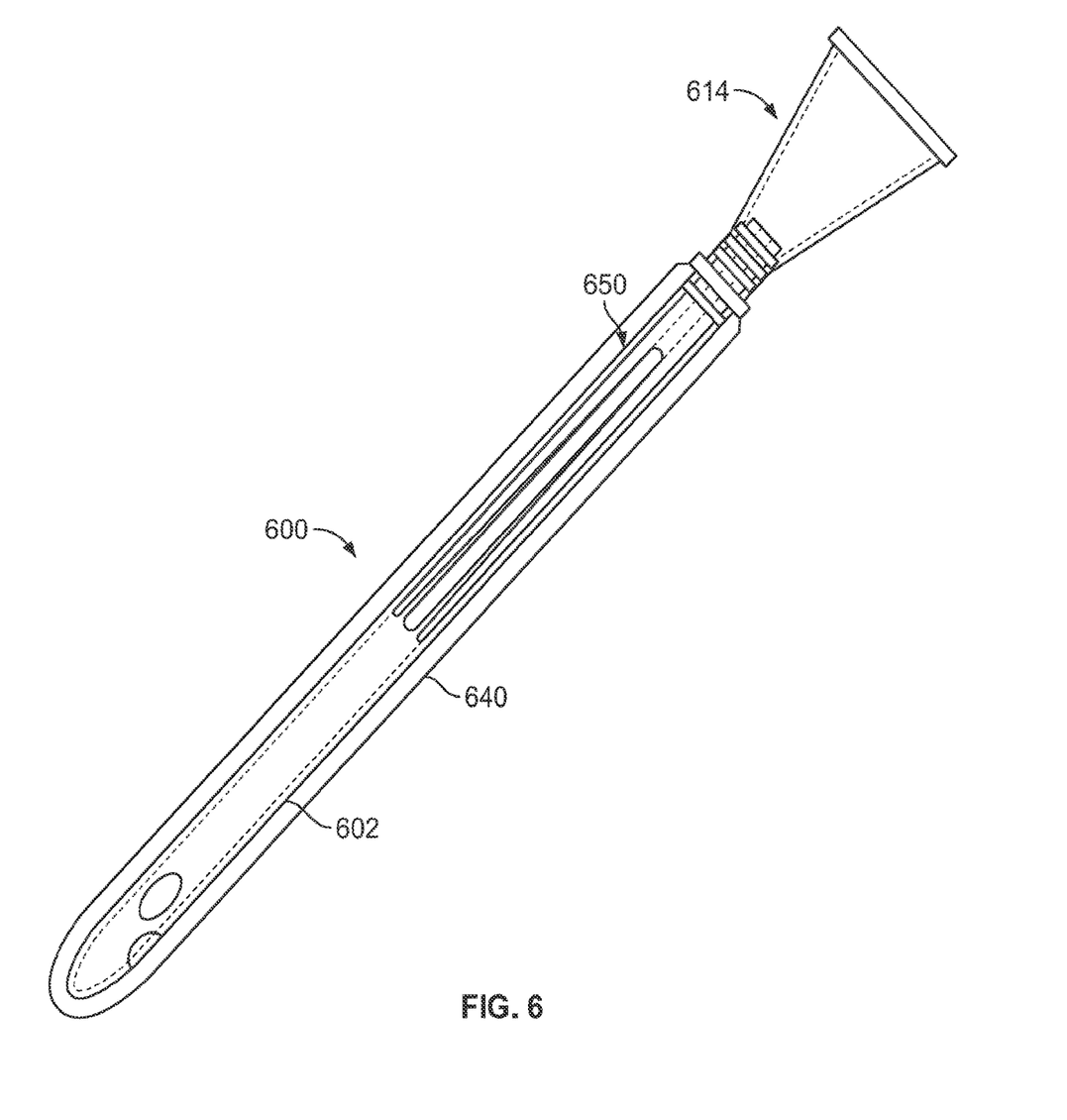
FIG. 6 is a perspective view of an embodiment of a urinary catheter assembly having a sleeve.

FIG. 6 shows an embodiment of a catheter assembly 600 including a sleeve 640. The sleeve 640 may surround the catheter shaft 602 and also the connector 650. The sleeve may be designed to protect the assembly 600 from external contact. As the catheter shaft 602 is inserted, the sleeve 640 may be pushed back, exposing the portion of the catheter shaft 602 that is inserted. The sleeve 640 may be made of any appropriate polymer including LDPE and HDPE. The sleeve may be attached to the connector such that it is configured to cover the catheter shaft once the shaft has been inserted into the connector.

Figure 7:
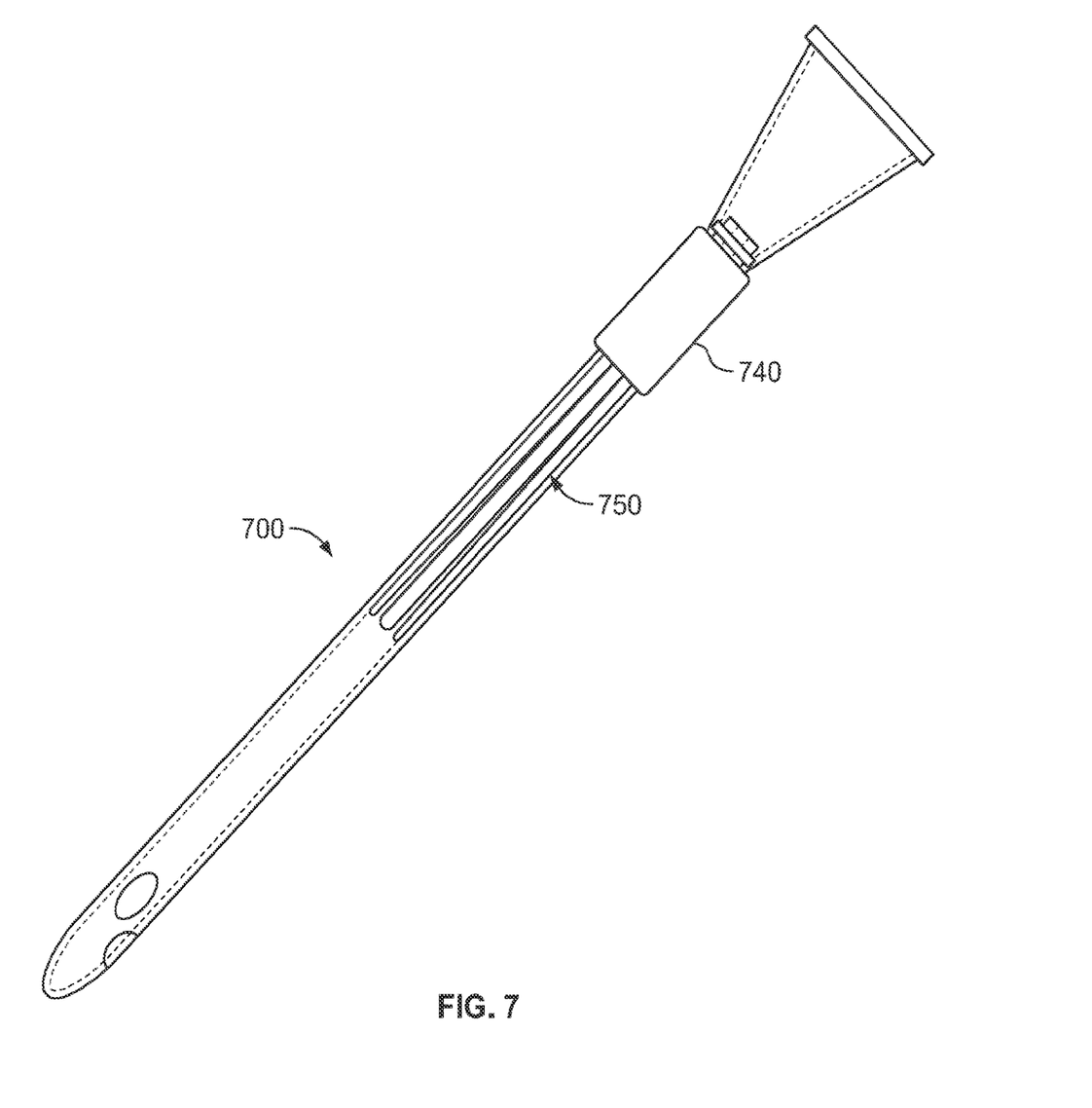
FIG. 7 is a perspective view of an embodiment of a urinary catheter assembly having a gripping member.

FIG. 7 shows a catheter assembly 700 including a gripping member (gripper) 740. The gripper 740 may be releasably attached to the connector 750 by any appropriate means. In an embodiment, the gripper 740 may be attached by welding. The gripper 740 makes it easier for a user to hold on to the catheter during use, making the assembly more user friendly.

In the embodiments shown in FIGS. 1-7, the catheter shaft may be made from any appropriate polymer including thermoplastic elastomer (TPE) and Polyvinyl Chloride (PVC). Additionally, the connector including the reinforcement member, the splines, and the drainage member may be made out of appropriate polymers, including High-density Polyethylene (HDPE), and Low-density polyethylene (LDPE).

In addition to the push-fit and mechanical connections described above, the connector and drainage member may be attached by other appropriate mechanical connections. For example, in an embodiment, the inner wall of the drainage member may be connected to the stub shaft by a plurality of barbs.

Furthermore, in each embodiment described above, optionally, the spline may have a length that is at least 20% of the length of the catheter shaft lumen. For example, in a male catheter embodiment that is 40 cm in length, the spine may have a length that is greater than or equal to 8 cm. For a female catheter that is 20 cm in length, the spline may have a length that is greater than or equal to 4 cm. Depending on the size of the catheter, in alternative embodiments, other appropriate lengths may be used.

In all embodiments described above, and in all alternative embodiments, the splines may act as a reinforcement for the portion of the catheter shaft that is in contact with or comes into contact with the splines. The splines may serve to stiffen or make the portion of the catheter shaft that is reinforced by the splines relatively more rigid than the portion of the catheter shaft that is not reinforced. As mentioned above, rigidity/flexibility of the reinforcement member/splines can be modified or tailored as desired by altering the cross-sectional shape of the splines, altering or tapering the spline profile along its length, altering or tapering the wall thickness of the splines, and altering or tapering the outer dimensions of the splines, and altering or tapering the thickness of the vanes. In some embodiments, the thickness of the vanes or splines may be thicker at its outer dimensions and may vary or taper as it moves toward the central axis. In alternative embodiments the thickness of the vanes or splines may be thicker at the central axis and may vary or taper as it moves toward its outer dimensions. Overall, the reinforcement/splines have the effect of adding variable stiffness and flexibility to the catheter shaft. This alters flow rate, including maximizing flow rate in some embodiments.

In all embodiments described above, and in all alternative embodiments, the catheters may be, but are not limited to, hydrophilic catheters. Additionally, parts of the catheter shaft may include a hydrophilic coating. When the hydrophilic coating is wetted or hydrated with a hydration medium, such as water, it becomes lubricious. The lubricity eases introduction of the device into the body and aids in reducing pain and discomfort associated with such introduction. The hydrophilic coating can be a single layer or a multilayer hydrophilic coating. Multi-layered coating can include at least a base coat and a top layer. The hydrophilic coating may be placed on at least one of the catheter shaft outer surface and the catheter shaft inner surface. In other embodiments, the outer surface of the catheter may include a lubricous gel. The hydrophilic coating may be placed on the catheter shaft inner surface. When the inner surface is coated, the hydrophilic coating may increase fluid flow rate.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. An intermittent urinary catheter assembly, comprising:
   a catheter shaft including an inner drainage lumen, the inner drainage lumen having a proximal end portion and a distal end portion;
   a reinforcement member having a proximal end portion and a distal end portion, the proximal end portion of the reinforcement member extending longitudinally at least partially within the distal end portion of the inner drainage lumen, the reinforcement member including a drainage passageway in fluid communication with the inner drainage lumen of the shaft for allowing the drainage of urine therethrough; and
   a drainage member coupled to the distal portion of the reinforcement member and outside of the distal end portion of the drainage lumen.

2. The assembly of claim 1, wherein the reinforcement member is mechanically attached to the catheter shaft.

3. The assembly of claim 1, wherein the reinforcement member is push-fit into the inner drainage lumen of the catheter shaft.

4. The assembly of claim 1, wherein the catheter shaft further includes an inner wall defining the inner drainage lumen, and the reinforcement member includes a connector portion that has at least one shoulder extending radially from the reinforcement member, wherein the at least one shoulder engages the inner wall of the catheter shaft.

5. The assembly of claim 4, wherein the at least one shoulder has a generally flared shape.

6. The assembly of claim 4, wherein a distal end of the connector portion defines a stub shaft that extends beyond the distal end portion of the inner drainage lumen, and a drainage member includes a lumen that is push-fit over the stub shaft.

7. The assembly of claim 6, wherein an inner wall of the drainage member defines the lumen of the drainage member, and the stub shaft includes at least one shoulder that engages the inner wall of the drainage member.

8. The assembly of claim 7, wherein the at least one shoulder of the stub shaft has a flared shape.

9. The assembly of claim 1, wherein the drainage member and the reinforcement member are of unitary construction.

10. The assembly of claim 1, wherein the drainage member and the reinforcement member are separate components that are mechanically attached to one another.

11. The assembly of claim 1, wherein the reinforcement member includes at least one spline.

12. The assembly of claim 11, wherein the at least one spline includes a plurality of splines.

13. The assembly of claim 11, wherein the spline has a substantially circular cross-section.

14. The assembly of claim 13, wherein the spline has a substantially cruciform cross-section.

15. The assembly of claim 11, wherein the at least one spline includes a plurality of vanes extending longitudinally from along the spline and wherein the vanes radiate outwardly from a central axis.

16. The assembly of claim 15, wherein the vanes include one or more notches.

17. The assembly of claim 1, wherein the reinforcement member includes a tapered portion.

18. A connector for connecting a catheter shaft to a drainage member, the connector comprising:
   a proximal end portion comprising a reinforcement member configured to extend longitudinally at least partially within a distal end portion of an inner drainage lumen of the catheter shaft, the reinforcement member including a drainage passageway configured to be in fluid communication with the inner drainage lumen of the shaft for allowing the drainage of urine therethrough; and
   a distal end portion coupled to the drainage member.

19. The connector of claim 18, wherein the drainage member and the reinforcement member are of unitary construction.

20. The connector of claim 18, wherein the drainage member and the reinforcement member are separate components that are mechanically attached to one another.

* * * * *